(12) United States Patent
Namiki et al.

(10) Patent No.: US 8,859,475 B2
(45) Date of Patent: Oct. 14, 2014

(54) GREASE COMPOSITION FOR BEARING OF WIND POWER GENERATOR

(75) Inventors: Minoru Namiki, Fujisawa (JP); Daming Dong, Fujisawa (JP); Terasu Yoshinari, Fujisawa (JP)

(73) Assignee: Kyodo Yushi Co., Ltd., Kanagawa (JP)

( * ) Notice: Subject to any disclaimer, the term of this patent is extended or adjusted under 35 U.S.C. 154(b) by 0 days.

(21) Appl. No.: 13/500,976

(22) PCT Filed: Oct. 15, 2010

(86) PCT No.: PCT/JP2010/068161
§ 371 (c)(1),
(2), (4) Date: Apr. 9, 2012

(87) PCT Pub. No.: WO2011/046201
PCT Pub. Date: Apr. 21, 2011

(65) Prior Publication Data
US 2012/0196781 A1 Aug. 2, 2012

(30) Foreign Application Priority Data

Oct. 15, 2009 (JP) ................................ 2009 238433

(51) Int. Cl.
| | | |
|---|---|---|
| C10M 115/08 | (2006.01) |
| C10M 137/10 | (2006.01) |
| C10M 169/02 | (2006.01) |
| C10M 169/00 | (2006.01) |

(52) U.S. Cl.
CPC .......... *C10M 169/00* (2013.01); *C10N 2230/02* (2013.01); *C10M 2207/2805* (2013.01); *C10M 2223/045* (2013.01); *C10N 2240/02* (2013.01); *C10M 169/02* (2013.01); *C10M 2207/129* (2013.01); *C10M 2207/2835* (2013.01); *C10M 2203/1025* (2013.01); *C10M 2205/0285* (2013.01); *C10M 2219/046* (2013.01); *C10N 2230/12* (2013.01); *C10M 2215/1026* (2013.01); *C10M 2207/127* (2013.01); *C10N 2250/10* (2013.01); *C10M 2207/0406* (2013.01); *C10M 2217/0456* (2013.01); *C10N 2210/02* (2013.01); *C10M 2219/044* (2013.01); *C10M 2207/026* (2013.01); *C10N 2230/52* (2013.01)
USPC ......................................... 508/552; 508/329

(58) Field of Classification Search
CPC ............. C10M 2203/1006; C10M 2203/1025; C10M 2205/02; C10M 2215/1026; C10M 2219/044
USPC ................................................. 508/552, 329
See application file for complete search history.

(56) References Cited

U.S. PATENT DOCUMENTS

| | | | |
|---|---|---|---|
| 4,115,284 A | 9/1978 | Kinoshita et al. | |
| 5,578,236 A | 11/1996 | Srinivasan et al. | |
| 6,251,841 B1 * | 6/2001 | Koizumi et al. | ............... 508/390 |
| 7,271,135 B2 | 9/2007 | Asao et al. | |
| 8,003,582 B2 | 8/2011 | Mikami | |
| 2004/0198612 A1 | 10/2004 | Asao et al. | |
| 2006/0154831 A1 * | 7/2006 | Iwano | ........................... 508/390 |
| 2007/0072777 A1 * | 3/2007 | Okamura et al. | ............. 508/367 |
| 2007/0154128 A1 | 7/2007 | Mikami | |
| 2007/0287646 A1 * | 12/2007 | Kawamura et al. | ........... 508/590 |
| 2008/0026963 A1 | 1/2008 | Sakamoto et al. | |
| 2008/0161214 A1 | 7/2008 | Asakura et al. | |
| 2008/0234150 A1 | 9/2008 | Kakizaki et al. | |
| 2010/0093567 A1 * | 4/2010 | Endo et al. | ..................... 508/100 |
| 2011/0207535 A1 | 8/2011 | Mikami | |
| 2012/0149614 A1 | 6/2012 | Mikami | |

FOREIGN PATENT DOCUMENTS

| | | | |
|---|---|---|---|
| CN | 1918269 A | | 2/2007 |
| JP | H08209174 | | 8/1996 |
| JP | 2004346298 | | 12/2004 |
| JP | 2006045577 | | 2/2006 |
| JP | 2006-77967 | | 3/2006 |
| JP | 2006-161624 | | 6/2006 |
| JP | 2006-182909 | | 7/2006 |
| JP | 2007-063423 | | 3/2007 |
| JP | 2008-38088 | | 2/2008 |
| JP | 2008-111514 | | 5/2008 |
| JP | 2008-143958 | | 6/2008 |
| JP | 2009-185084 A | | 8/2009 |
| JP | 2010065142 A | * | 3/2010 |
| WO | 2005075610 | | 8/2005 |

OTHER PUBLICATIONS

Chinese Office Action and Search Report issued for Chinese Patent Application No. 201080046152.5, dated Jan. 25, 2013 (6 pages).
International Search Report for PCT/JP2010/068161 mailed Dec. 21, 2010.
Written Opinion of the International Searching Authority mailed Dec. 21, 2010.
European Search Report issued for European Patent Application No. 10823469.1-1352, dated May 13, 2013.
Japanese Office Action issued for Japanese Patent Application No. 2009-238433, dated Jan. 27, 2014.

* cited by examiner

*Primary Examiner* — Vishal Vasisth
(74) *Attorney, Agent, or Firm* — Nixon & Vanderhye P.C.

(57) ABSTRACT

The invention provides a grease composition for bearings used in wind power generators, containing a base oil which has a kinematic viscosity of 10 to 70 mm$^2$/s at 40° C. and a pour point of −40° C. or less, and a diurea compound as a thickener, for example, a diurea compound represented by formula (1) where R$^1$ and R$^2$ are both C8-alkyl group. The grease composition for bearings used in wind power generators according to the invention can meet the requirements in terms of the seizure life and the pumpability as well as the fatigue life (flaking life).

(1)

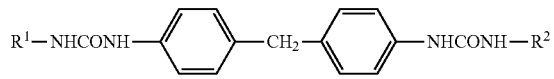

6 Claims, No Drawings

GREASE COMPOSITION FOR BEARING OF WIND POWER GENERATOR

This application is the U.S. national phase of International Application No. PCT/JP2010/068161 filed 15 Oct. 2010 which designated the U.S. and claims priority to JP 2009-238433 filed 15 Oct. 2009, the entire contents of each of which are hereby incorporated by reference.

TECHNICAL FIELD

The present invention relates to a grease composition used for the bearings of wind power generator, such as the main shaft bearing, yaw bearing, pitch bearing and the like.

BACKGROUND ART

Most of the bearings used in the wind power generator have an outer diameter of as large as one meter or more, and show the low number of revolutions. This makes the lubricating oil film thinner, so that it has been apprehended that the bearings may soon reach the end of fatigue life. To cope with the problem of fatigue life, the conventional grease compositions employ high-viscosity base oils to ensure a sufficiently thick oil film.

In the general-purpose bearings, the reasons for a short seizure life almost lies in fracture of the oil film due to insufficient supply of the lubricating oil and lack of maintenance of the oil film. As for the bearings used in the wind power generator, however, no special attention has been paid to the above-mentioned problems, and the composition of grease has scarcely become a target of study. This is because the design of the wind power generator is based on the concept that the generator has an oil feeding system therein, which can feed a fresh grease to the portions to be lubricated, thereby keeping the maintenance of the oil film.

However, the conventional grease compositions for bearings used in the wind power generator show low fluidity because the viscosity of the base oil is increased as a measure against the short fatigue life. Therefore, grease cannot be readily replaced at the portions to be lubricated even though the grease is newly fed thereto. As a result, the oil film cannot be repaired successfully, whereby the seizure life of the bearing disadvantageously reaches its end.

Further, the wind power generator is placed outside, and sometimes may be operated under the condition of low temperatures, for example, around −40° C. Unfortunately, the conventional grease compositions for bearings of the wind power generator use high-viscosity base oils, so that there is the problem that the grease compositions cannot be even pumped out for replenishment due to abnormally increased apparent viscosity at low temperatures. Then, the span of the seizure life becomes shorter when the bearing is operated at low temperatures.

For the grease compositions for bearing used in the wind power generator, some measures are taken against the fatigue (flaking) and the wear by addition of additives (JP 2006-161624 A, JP 2007-63423 A, JP 2008-38088 A and JP 2008-111514 A). In those cases, however, shortening of the life span resulting from seizing is not taken into consideration. There is no description about the techniques to improve the fluidity of grease by decreasing the kinematic viscosity of the employed base oil, either.

Recently, the wind power generator has been built on the sea because it is difficult to secure the space for building on the land. When used on the sea, the bearings are exposed to the sea breeze and gather rust by the influence of salt water, thereby causing the problems that the bearings become non-rotatable by the presence of rust, and the rust results in the damage of the bearings. Nevertheless, no consideration has been given to such operating condition where the grease for the bearings is used on the sea and no measure has been taken against rust in the conventional grease compositions.

SUMMARY OF INVENTION

Technical Problem

An object of the invention is to provide a grease composition for bearings used in the wind power generator, which is excellent not only from the viewpoint of fatigue life (flaking life), but also from the seizure life and the pumpability. Namely, the object of the invention is to provide a grease composition for bearings used in the wind power generator, capable of securing an oil film thickness equivalent to or more than that of the conventional grease compositions in order to extend the fatigue life; showing a fluidity enough to extend the seizure life; and showing a sufficiently low apparent viscosity at −40° C.

Solution to Problem

As a result of extensive study, the inventors of the present invention have found that the above-mentioned problems can be solved by using a base oil which has a low kinematic viscosity at 40° C. in combination with a diurea compound as a thickener.

Namely, the invention provides a grease composition for bearings used in wind power generators, comprising a base oil which has a kinematic viscosity of 10 to 70 mm$^2$/s at 40° C. and a pour point of −40° C. or less, and a diurea compound as a thickener.

The invention also provides the above-mentioned grease composition for bearings used in wind power generators, wherein the diurea compound is represented by the following formula (1):

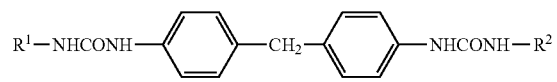

(1)

wherein R$^1$ and R$^2$, which may be the same or different, represent a straight-chain or branched alkyl group having 6 to 30 carbon atoms, an aryl group having 6 to 12 carbon atoms, an alkylaryl group having 7 to 12 carbon atoms, or cyclohexyl group, provided that the alkyl group having 6 to 30 carbon atoms is contained in an amount of 25 mol % or more based on the total number of moles of R$^1$ and R$^2$.

The invention also provides the above-mentioned grease composition for bearings used in wind power generators, wherein the base oil comprises at least one selected from the group consisting of mineral oils, synthetic hydrocarbon oils, synthetic ester oils and phenyl ether oils.

The invention also provides the above-mentioned grease composition for bearings used in wind power generators, further comprising as an additive an organic sulfonate rust inhibitor that is neutral or has a total base number of less than 50 mgKOH/g.

Effects of Invention

According to the invention, it is possible to provide a grease composition for bearings used in wind power generators which can ensure the oil film thickness without using a base oil with high kinematic viscosity. As previously mentioned, the fluidity of grease can be improved and the seizure life can be extended when the base oil has a kinematic viscosity of 10 to 70 mm²/s at 40° C. and a pour point of −40° C. or less. Although the base oil used in the grease composition has a low viscosity, use of a diurea compound as the thickener makes it possible to form a thick film owing to the presence of urea, and ensure an oil film with a sufficient thickness to solve the problem of fatigue life.

DESCRIPTION OF EMBODIMENTS

Base Oil

The base oil used in the invention has a kinematic viscosity of 10 to 70 mm²/s at 40° C. to obtain satisfactory fluidity of the grease, and a pour point of −40° C. or less to ensure the fluidity at low temperatures. When the kinematic viscosity at 40° C. is less than 10 mm²/s, the base oil becomes unsuitable for grease because the base oil tends to easily vaporize at elevated temperatures and shows poor heat resistance. When the kinematic viscosity at 40° C. exceeds 70 mm²/s, a sufficient fluidity as desired by the invention cannot be obtained. For the same reasons as mentioned above, preferable kinematic viscosity at 40° C. may be in the range of 20 to 60 mm²/s.

The kind of base oil used for the composition of the invention is not particularly limited so long as the kinematic viscosity and the pour point are within the respective ranges as mentioned above. More specifically, mineral oils, synthetic hydrocarbon oils including poly α-olefin oils, ester-based synthetic oils including diester oils and polyol ester oils; polyglycol oils including polypropylene glycols; phenyl ether-based synthetic oils including alkyl diphenyl ethers; fluorine-containing synthetic oils including PFPE; and mixtures thereof can be used. It is preferable that the base oil comprise at least one selected from the group consisting of mineral oils, synthetic hydrocarbon oils, synthetic ester oils and phenyl ether oils. It is more preferable to use synthetic hydrocarbon oils alone or in combination with mineral oils because the synthetic hydrocarbon oils have little adverse effect on the resin materials, rubber materials and the like surrounding the grease composition.

[Thickener]

The thickener used in the invention is not particularly limited so long as a diurea compound is used. Use of the diurea compound can ensure a desired thickness of the resultant oil film. This is a unique phenomenon of the diurea compound, and other kinds of thickeners cannot exhibit such an effect. The preferable thickener is represented by the following formula (1):

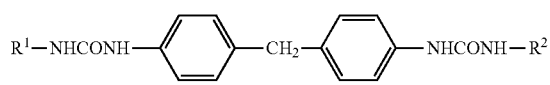

(1)

wherein $R^1$ and $R^2$, which may be the same or different, represent a straight-chain or branched alkyl group having 6 to 30 carbon atoms, an aryl group having 6 to 12 carbon atoms, an alkylaryl group having 7 to 12 carbon atoms, or cyclohexyl group, provided that the alkyl group having 6 to 30 carbon atoms is contained in an amount of 25 mol % or more based on the total number of moles of $R^1$ and $R^2$.

As the above-mentioned alkyl group, alkyl groups having 6 to 20 carbon atoms are preferable.

As the above-mentioned aryl group, phenyl group is preferable.

As the above-mentioned alkylaryl group, phenyl group having as a substituent an alkyl group with 1 to 6 carbon atoms is preferable, and in particular, 4-methylphenyl group is more preferable.

In the compound of formula (1), the alkyl group having 6 to 30 carbon atoms is preferably contained in an amount of 25 mol % or more, more preferably 30 mol % or more, based on the total number of moles of $R^1$ and $R^2$.

When the alkyl group having 6 to 30 carbon atoms is contained in an amount of less than 25 mol %, the amount of thickener should be increased, which may impair the fluidity of grease. When the content of the above-mentioned alkyl group is 25 mol % or more, the amount of thickener can be reduced to ensure the fluidity of grease.

As the diurea compound used in the invention, the following diurea compounds are particularly preferable:

a diurea compound of formula (1) wherein $R^1$ and $R^2$ are both an alkyl group having 8 carbon atoms, with the C8-alkyl group being contained in an amount of 100 mol % based on the total number of moles of $R^1$ and $R^2$;

a mixture of a diurea compound of formula (1) wherein $R^1$ and $R^2$ are both an alkyl group having 18 carbon atoms, a diurea compound of formula (1) wherein $R^1$ and $R^2$ are both cyclohexyl group, and a diurea compound of formula (1) wherein $R^1$ is an alkyl group having 18 carbon atoms and $R^2$ is cyclohexyl group, with the C18-alkyl group being contained in an amount of 30 mol % or more based on the total number of moles of $R^1$ and $R^2$ in the mixture; and a mixture of a diurea compound of formula (1) wherein $R^1$ and $R^2$ are both an alkyl group having 8 carbon atoms, a diurea compound of formula (1) wherein $R^1$ and $R^2$ are both 4-methylphenyl group, and a diurea compound of formula (1) wherein $R^1$ is an alkyl group having 8 carbon atoms and $R^2$ is 4-methylphenyl group, with the C8-alkyl group being contained in an amount of 30 mol % or more based on the total number of moles of $R^1$ and $R^2$ in the mixture.

The diurea thickeners as mentioned above can be obtained by reacting an alkyl monoamine such as octylamine, stearylamine, dodecylamine, hexadecylamine or the like, an aryl monoamine such as aniline, p-toluidine or the like, or a monoamine such as cyclohexylamine or the like, with diphenylmethane-4,4'-diisocyanate.

In the grease composition, the diurea thickener may preferably be contained in an amount of 2 to 25 mass %, and more preferably 3 to 20 mass %. According to the invention, the content of the thickener can be reduced in order to satisfy the requirements of fluidity and the pumpability at low temperatures not only by using a base oil having a low viscosity and a low pour point, but also by using a thickener where the alkyl groups represented by $R^1$ and $R^2$ are contained in an amount of 25 mol % or more.

[Auxiliary Components]

The composition of the invention may further comprise a rust inhibitor, a load carrying additive, an antioxidant and the like when necessary. Such components may be generally contained in an amount of about 0.1 to 20 mass %, preferably 0.5 to 10 mass %.

[Rust Inhibitor]

By the addition of a rust inhibitor, it is possible to provide a grease composition for bearings used in wind power generators, which does not cause rust formation even though salt water penetrates into the bearings of the wind power generator which is built on the sea. As the rust inhibitor, an organic sulfonate rust inhibitor that is neutral or has a total base number of less than 50 mgKOH/g is advantageously used. This kind of rust inhibitor can effectively prevent the bearing from gathering rust even when the bearing is exposed to salt water.

Examples of the organic sulfonate that can be used in the invention include salts of benzenesulfonic acid or naphthalenesulfonic acid which may be mono- or di-substituted with an alkyl group having 1 to 12 carbon atoms, such as the salts of alkaline earth metals such as calcium, magnesium, barium and the like, the salts of alkali metals such as sodium, potassium, lithium and the like, zinc salts, lead salts, ammonium salts, amine salts including ethylenediamine salts and the like. Particularly, calcium salts, barium salts, zinc salts and ammonium salts are preferable; and calcium salts, zinc salts and ammonium salts of naphthalenesulfonic acid which may be mono- or di-substituted with an alkyl group having 1 to 12 carbon atoms are more preferable; and zinc salts of naphthalenesulfonic acid which may be mono- or di-substituted with an alkyl group having 1 to 12 carbon atoms are most preferable.

In the invention, the total base number is determined in accordance with JIS K 2501.

[Load Carrying Additive]

As the load carrying additive, phosphorus-containing compounds such as phosphates and the like, sulfur-containing compounds such as polysulfide, sulfated oil and the like; phosphorus-sulfur based compounds such as phosphorothionate and the like; thiocarbamates, thiophosphates (e.g., zinc dialkyldithiophosphate (ZnDTP)); organic phosphates and the like can be used. In addition, solid lubricants such as $MoS_2$, graphite, MCA, PTFE and the like can also be used.

[Antioxidant]

The antioxidant is known as an oxidation degradation inhibitor for grease. The antioxidant that can be used in the invention includes phenol-based antioxidants, amine-based antioxidants and the like.

Examples of the phenol-based antioxidant include 2,6-di-tert-butyl-p-cresol (BHT), 2,2'-methylenebis(4-methyl-6-tert-butylphenol), 4,4'-butylidenebis(3-methyl-6-tert-butylphenol), 2,6-di-tert-butylphenol, 2,4-dimethyl-6-tert-butylphenol, tert-butyl hydroxyanisole (BHA), 4,4'-butylidenebis(3-methyl-6-tert-butylphenol), 4,4'-methylenebis(2,3-di-tert-butylphenol), 4,4'-thiobis(3-methyl-6-tert-butylphenol) and the like.

Examples of the amine-based antioxidant include N-n-butyl-p-aminophenol, 4,4'-tetramethyl-di-aminodiphenyl-methane, α-naphthylamine, N-phenyl-α-naphthylamine, phenothiazine, and the like.

EXAMPLES

Examples and Comparative Examples

The aliphatic diurea grease, alicyclic-aliphatic diurea grease, and aromatic-aliphatic diurea grease were used as the base greases in Examples and Comparative Examples. Those diurea thickeners and the respective synthesizing methods are shown in Table A. For the lithium soap grease, a mixture of the base oil and lithium stearate was heated with stirring, and completely dissolved at 230° C. and then cooled. The resultant grease was used as a base grease.

A variety of additives were added to each of those base greases. After mixing with stirring, the resultant mixture was kneaded using a three-roll mill to obtain each sample. In the above-mentioned procedures, the base oils and other components as shown below were used. The figures in Tables represent the percentage by mass based on the total mass of the composition.

The kinematic viscosity at 40° C. and the pour point of the base oil were determined using the following methods. The consistency (JIS K2220) of every composition prepared in Examples and Comparative Examples was adjusted to 300.

<Test Methods>

(1) Kinematic Viscosity

Test method: The kinematic viscosity of each base oil was determined at 40° C. in accordance with JIS K2283.

(2) Pour Point

Test method: The pour point of each base oil was determined in accordance with JIS K2269.

Judgment: The pour point of −40° C. or less was regarded as acceptable (o), and that of higher than −40° C. was regarded as unacceptable (x).

(3) Fatigue Life

Test method: The oil film thickness was determined using an apparatus for measuring the EHL film thickness by optical interference. The test was conducted under the conditions that the temperature was 70° C., the contact pressure was 0.56 GPa, and the velocity was 0.04 msec. The above-mentioned conditions are those where the oil film becomes the thinnest in practical use.

Judgment: The thickness of the obtained oil film was compared with a theoretical value (60 nm) of the minimum oil film thickness obtained by using the high-viscosity base oil within a low-velocity range. The fatigue life was regarded as acceptable (o) when the thickness of the obtained oil film exceeded the theoretical value; and as unacceptable (x) when the thickness of the obtained oil film was less than the theoretical value.

(4) Seizure Life

Test method: To determine the flow resistance of grease, a predetermined shear force ($0.1\ \text{sec}^{-1}$, 25° C.) was applied to the grease to measure the maximum shear stress using a rheometer. The maximum shear stress was used as the yield stress.

Judgment: When the yield stress was 400 Pa or less, the seizure life was regarded as long and acceptable (o) due to the good fluidity of grease. When the yield stress exceeded 400 Pa, the seizure life was regarded as unacceptable (x).

(5) Pumpability

Test method: To evaluate the pumpability of grease at low temperatures, a predetermined shear force ($100\ \text{s}^{-1}$, −40° C.) was applied to the grease to determine the apparent viscosity using a rheometer.

Judgment: When the apparent viscosity was 100 P·s or less, the pumpability was regarded as acceptable (o). The apparent viscosity of higher than 100 P·s was regarded as unacceptable (x).

(6) Rust Preventive Properties

Test method: A 0.5% salt water was added to each of the compositions prepared in Examples and Comparative Examples in an amount of 5% to obtain test specimens. A test for rust preventive properties of bearings in presence of salt water was conducted in accordance with ASTM D1743-73. Each test specimen grease composition was placed in the bearing, which was then rotated. After that, the bearing was immersed into a 0.5% salt water for one minute. The bearing was allowed to stand at 25° C. for 24 hours, and then the rolling surface of the outer ring was visually inspected whether rust gathered or not.

Judgment: No formation of rust was regarded as acceptable (o), and formation of rust was regarded as unacceptable (x).

TABLE A

Structural Formula (1)

$$R^1-NHCONH-\langle\text{phenyl}\rangle-CH_2-\langle\text{phenyl}\rangle-NHCONH-R^2$$

| Name | Structural Formula |
|---|---|
| Aliphatic diurea | Diurea compound of formula (1) wherein $R^1$ and $R^2$ are both C8-alkyl group. The above-mentioned compound was synthesized by reacting one mole of diphenylmethane-4,4-diisocyanate with two moles of C8-alkylamine in the base oil at 80° C. |
| Alicyclic-aliphatic diurea | Mixture of a diurea compound of formula (1) wherein $R^1$ and $R^2$ are both C18-alkyl group, a diurea compound of formula (1) wherein $R^1$ and $R^2$ are both cyclohexyl group, and a diurea compound of formula (1) wherein $R^1$ is C18-alkyl group and $R^2$ is cyclohexyl group. The C18-alkyl group was contained in an amount of 30 mol % based on the total number of moles of $R^1$ and $R^2$. The above-mentioned compound was synthesized by reacting one mole of diphenylmethane-4,4-diisocyanate with 1.4 moles of cyclohexylamine and 0.6 moles of C18-alkylamine in the base oil at 80° C. |
| Aromatic-aliphatic diurea | Mixture of a diurea compound of formula (1) wherein $R^1$ and $R^2$ are both C8-alkyl group, a diurea compound of formula (1) wherein $R^1$ and $R^2$ are both 4-methylphenyl group, and a diurea compound of formula (1) wherein $R^1$ is C8-alkyl group and $R^2$ is 4-methylphenyl group. The C8-alkyl group was contained in an amount of 30 mol % based on the total number of moles of $R^1$ and $R^2$. The above-mentioned compound was synthesized by reacting one mole of diphenylmethane-4,4-diisocyanate with 1.4 moles of p-toluidine and 0.6 moles of C8-alkylamine in the base oil at 80° C. |

TABLE 1

| | | | Examples | | | | | | | |
|---|---|---|---|---|---|---|---|---|---|---|
| | | | 1 | 2 | 3 | 4 | 5 | 6 | 7 | 8 |
| Base Grease | Base oil | Mineral oil A | 8 | — | — | — | — | — | — | — |
| | | Synthetic hydrocarbon oil A | — | — | 81 | — | — | — | — | — |
| | | Synthetic hydrocarbon oil B | 73 | 81 | — | 29 | 49 | 81 | 81 | 90 |
| | | Ester oil | — | — | — | 44 | — | — | — | — |
| | | Ether oil | — | — | — | — | 33 | — | — | — |
| | | Kinematic viscosity (mm²/s) (40° C.) | 60 | 48 | 18 | 64 | 64 | 48 | 48 | 48 |
| | | Pour point (−40° C.) | ○ | ○ | ○ | ○ | ○ | ○ | ○ | ○ |
| | Thickener | Aliphatic diurea | 10 | 10 | 10 | — | — | 10 | 10 | 10 |
| | | Alicyclic - aliphatic diurea | — | — | — | — | 9 | — | — | — |
| | | Aromatic - aliphatic diurea | — | — | — | 18 | — | — | — | — |
| Rust Inhibitor Additive | | Ca sulfonate (neutral) | 5 | — | — | 5 | — | — | — | — |
| | | Zn sulfonate (neutral) | — | 5 | — | — | 5 | — | — | — |
| | | Ammonium sulfonate (neutral) | — | — | 5 | — | — | — | — | — |
| | | Ca sulfonate (TBN = 200) | — | — | — | — | — | 5 | — | — |
| | | Succinic anhydride | — | — | — | — | — | — | 5 | — |
| Load Carrying Additive | | Zinc dithiophosphate | 2 | 2 | 2 | 2 | 2 | 2 | 2 | — |
| Antioxidant | | Phenol-based antioxidant | 2 | 2 | 2 | 2 | 2 | 2 | 2 | — |
| Fatigue Life | | EHL film thickness (70° C.) | ○ | ○ | ○ | ○ | ○ | ○ | ○ | ○ |
| Seizure life | | Yield stress (25° C.) | ○ | ○ | ○ | ○ | ○ | ○ | ○ | ○ |
| Pumpability | | Apparent viscosity (−40° C.) | ○ | ○ | ○ | ○ | ○ | ○ | ○ | ○ |
| Rust Preventive Properties | | Rust preventive properties of bearing in presence of salt water | ○ | ○ | ○ | ○ | ○ | x | x | x |

TABLE 2

| | | | Comparative Examples | | | | | |
|---|---|---|---|---|---|---|---|---|
| | | | 1 | 2 | 3 | 4 | 5 | 6 |
| Base Grease | Base oil | Mineral oil A | — | — | — | — | — | 24 |
| | | Synthetic hydrocarbon oil B | 82 | — | — | — | — | 57 |
| | | Synthetic hydrocarbon oil C | — | — | — | 61 | 62 | — |
| | | Synthetic hydrocarbon oil D | — | 81 | 82 | 20 | 20 | — |
| | | Kinematic viscosity (mm²/s) (40° C.) | 48 | 460 | 460 | 100 | 100 | 46 |
| | | Pour point (−40° C.) | ○ | ○ | ○ | ○ | ○ | x |
| | Thickener | Aliphatic diurea | — | 10 | — | 10 | — | 10 |
| | | Li soap | 9 | — | 9 | — | 9 | — |
| Rust Inhibitor Additive | | Ca sulfonate (neutral) | — | 5 | — | — | — | 5 |
| | | Zn sulfonate (neutral) | 5 | — | 5 | 5 | 5 | — |
| Load Carrying Additive | | Zinc dithiophosphate | 2 | 2 | 2 | 2 | 2 | 2 |
| Antioxidant | | Phenol-based antioxidant | 2 | 2 | 2 | 2 | 2 | 2 |
| Fatigue Life | | EHL film thickness (70° C.) | x | ○ | ○ | ○ | x | ○ |
| Seizure life | | Yield stress (25° C.) | ○ | x | x | x | x | ○ |
| Pumpability | | Apparent viscosity (−40° C.) | ○ | x | x | x | x | x |

TABLE 2-continued

|  | | Comparative Examples | | | | | |
|---|---|---|---|---|---|---|---|
|  | | 1 | 2 | 3 | 4 | 5 | 6 |
| Rust Preventive Properties | Rust preventive properties of bearing in presence of salt water | ○ | ○ | ○ | ○ | ○ | ○ |

[Base oil]
Mineral oil A: 200 neutral oil: paraffinic mineral oil with a kinematic viscosity of 40 mm²/s (40° C.)
Synthetic hydrocarbon oil A: poly α-olefin oil with a kinematic viscosity of 18 mm²/s (40° C.)
Synthetic hydrocarbon oil B: poly α-olefin oil with a kinematic viscosity of 48 mm²/s (40° C.)
Synthetic hydrocarbon oil C: poly α-olefin oil with a kinematic viscosity of 71 mm²/s (40° C.)
Synthetic hydrocarbon oil D: poly α-olefin oil with a kinematic viscosity of 460 mm²/s (40° C.)
Ester oil: pentaerythritol ester oil with a kinematic viscosity of 79 mm²/s (40° C.)
Ether oil: alkyl diphenyl ether oil with a kinematic viscosity of 100 mm²/s (40° C.)
[Rust inhibitor additive]
Ca sulfonate (neutral): Ca salt of dinonylnaphthalenesulfonic acid
Zn sulfonate (neutral): Zn salt of dinonylnaphthalenesulfonic acid
Ammonium sulfonate (neutral): Amine salt of dinonylnaphthalenesulfonic acid
Ca sulfonate (TBN = 200): Overbased Ca salt of petroleum sulfonic acid
Succinic anhydride: Alkenyl succinic anhydride Effects (1) Fatigue Life (EHL Film Thickness)

When compared with the results of Comparative Examples 1 and 5 where a soap is used as the thickener, the results of Examples 1 to 8 where diurea compounds are used as the thickeners show the improvements in the EHL film thickness. In Comparative Example 3, the oil film thickness attains to a satisfactory level owing to the effect of using a high-viscosity base oil (as shown in the conventional measures).

(2) Seizure Life (Fluidity of Grease Measured with a Rheometer)

When compared with the results of Comparative Examples 2 to 5 where the kinematic viscosities of the base oils exceed 70 mm²/s, some improvements in the fluidity are recognized in the grease compositions of Examples 1 to 8 where the kinematic viscosities at 40° C. of the base oils are in the range of 10 to 70 mm²/s (3) Pumpability (Apparent Viscosity at −40° C.)

When compared with the result of Comparative Example 6 where the base oil used has a pour point of higher than −40° C., the results of Examples 1 to 8 using the base oils with a pour point of −40° C. or less show the improvements in the apparent viscosity at −40° C. The grease compositions of Comparative Examples 2 to 5 do not satisfy the requirements of the apparent viscosity at −40° C. because of the high kinematic viscosity, although the requirements of the pour point are satisfied.

(4) Rust Preventive Properties

The rust preventive properties in the presence of salt water are superior in the results of Examples 1 to 5 using an organic sulfonate based rust inhibitor which is neutral or has a total base number of less than 50 when compared with the results of Examples 6 to 8 and Comparative Examples where such a rust inhibitor is not contained.

The invention claimed is:

1. A grease composition for bearings used in wind power generators, comprising a base oil which has a kinematic viscosity of 10 to 70 mm²/s at 40° C. and a pour point of −40° C. or less, a diurea compound as a thickener, and as an additive an organic sulfonate rust inhibitor that is neutral or has a total base number of less than 50 mgKOH/g, wherein the sulfonate rust inhibitor comprises a zinc salt of benzenesulfonic acid or naphthalenesulfonic acid, wherein the diurea compound is represented by formula (1):

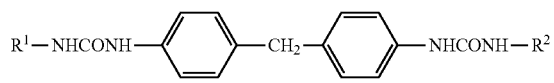

(1)

wherein $R^1$ and $R^2$, which may be the same or different, represent a straight-chain or branched alkyl group having 6 to 30 carbon atoms, and wherein the sulfonate rust inhibitor is present in a concentration ranging from 0.5 to 10 mass % of the grease composition.

2. The grease composition of claim 1, wherein the base oil comprises at least one selected from the group consisting of mineral oils, synthetic hydrocarbon oils, synthetic ester oils and phenyl ether oils.

3. A method lubricating bearings in wind power generators, the method comprising applying a grease composition to a component of a wind power generator, the grease composition comprising a base oil having a kinematic viscosity of 10 to 70 mm²/s at 40° C. and a pour point of −40° C. or less, and a diurea compound as a sole thickener to the bearings, and wherein the composition further comprises as an additive an organic sulfonate rust inhibitor that is neutral or has a total base number of less than 50 mgKOH/g, wherein the sulfonate rust inhibitor comprises a zinc salt of benzenesulfonic acid or naphthalenesulfonic acid, wherein the diurea compound is represented by formula (1):

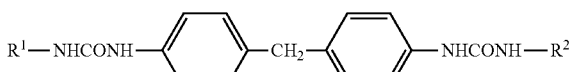

(1)

wherein $R^1$ and $R^2$, which may be the same or different, represent a straight-chain or branched alkyl group having 6 to 30 carbon atoms, and wherein the sulfonate rust inhibitor is present in a concentration ranging from 0.5 to 10 mass % of the grease composition.

4. The method of claim 3, wherein the base oil comprises at least one selected from the group consisting of mineral oils, synthetic hydrocarbon oils, synthetic ester oils and phenyl ether oils.

5. The composition of claim 1, wherein the sulfonate rust inhibitor is a zinc salt of dinonylnaphthalenesulfonic acid.

6. The method of claim 3, wherein the sulfonate rust inhibitor is a zinc salt of dinonylnaphthalenesulfonic acid.

\* \* \* \* \*